3,776,869
IMPROVED URETHANE ADHESIVES COMPRISING A BLEND OF A CASTOR OIL BASED ISOCYANATE PREPOLYMER WITH A TEREPENE PHENOLIC RESIN
Julius Sirota, South Plainfield, N.J., assignor to National Starch and Chemical Corporation, New York, N.Y.
No Drawing. Continuation-in-part of abandoned application Ser. No. 173,312, Aug. 19, 1971. This application Apr. 9, 1973, Ser. No. 349,036
Int. Cl. C08g 5/20
U.S. Cl. 260—24          1 Claim

ABSTRACT OF THE DISCLOSURE

Improved urethane adhesives having high green strength are disclosed comprising a blend of an isocyanate prepolymer derived from castor oil with a terpene phenolic resin.

RELATED APPLICATIONS

This application is a continuation-in-part of copending application Ser. No. 173,312, filed Aug. 19, 1971, now abandoned and assigned to the assignee of this application.

BACKGROUND OF THE INVENTION

This invention relates to adhesives used in laminating flexible webs and more particularly to improved urethane adhesives suitable for such lamination.

Flexible packages, suitable for containing items of food are frequently manufactured by laminating two thin, flexible webs by sealing the webs together at the edges, thus making a pouch to contain the food product. The webs used in packages of this type are plastic film, paper, and metal foils. The adhesives used in laminating the webs are commonly those of the urethane type based on isocyanate prepolymers which undergo a curing period to reach maximum strength. Naturally, these adhesives must have enough strength when the webs are first laminated so that they do not allow the formation of channels through the sealed area ("tunneling") before the adhesive has time to cure fully and form a strong bond. The adhesive strength of the freshly applied adhesive is known in the trade as "green strength." The isocyanate prepolymers ordinarily do not have sufficient green strength when used alone to provide a satisfactory adhesive for this application. Accordingly, it is common to incorporate in the adhesive a compatible thermoplastic high polymer. This polymer is frequently blended with the catalyst for the polyurethane and the blend is mixed with the isocyanate prepolymer immediately prior to use.

The isocyanate prepolymers used hitherto have been derived from polyesters or polyethers. Isocyanate prepolymers derived from castor oil are more economical than those derived from polyethers or polyesters and may be dissolved in lower cost aliphatic solvents for application. They have not been used hitherto, however, for film laminating because the reinforcing polymers used to confer high green strength on the adhesives using polyester or polyether derived isocyanate prepolymers, such as, for example, cellulose acetate, polyvinyl acetate, polyurethanes, and the like are not compatible with them. No other low-cost reinforcing high polymers suitable for use with castor oil derived isocyanate prepolymers have hitherto been discovered.

It has now been found that it is unnecessary to incorporate a high polymer reinforcing material to give high green strength to castor oil derived polyurethane adhesives. Rather, a terpene phenolic resin may be mixed with a castor oil derived isocyanate prepolymer to make a low cost laminating adhesive having good green strength.

SUMMARY OF INVENTION

It is an object of this invention to provide improved laminating adhesives having good green strength and more particularly to provide such adhesives made from castor oil derived isocyanate prepolymers.

According to this invention, laminating adhesives having good green strength can be prepared from castor oil derived isocyanate prepolymers by admixing with said prepolymer between 2.5 and 50%, by weight, of a terpene phenolic resin.

Although the terpene phenolic resins used in this invention are not high polymers such as have been used in the prior art and are not strong in themselves, they surprisingly confer on the castor oil derived polyurethane adhesives a high green strength. In addition, some of the terpene phenolic resins are completely soluble in aliphatic hydrocarbons, a property which permits the use of more economical solvents for applying the adhesives of this invention. The use of terpene phenolic additives also permits the lamination to be carried out at relatively low temperatures, i.e., 125° to 150° F., although higher temperatures may also be used. Furthermore, the adhesives of this invention have superior gloss and clarity.

DESCRIPTION OF THE PREFERRED EMBODIMENTS

The castor oil derived isocyanate prepolymers used in the adhesives of this invention are those prepared by reacting castor oil with toluene diisocyanate. The ratio of castor oil to toluene diisocyanate can be varied to produce prepolymers of varying isocyanate content, exhibiting corresponding variations in molecular weight, curing time, green strength, etc. The available or residual isocyanate content of typical prepolymers ranges from about 3.5% to about 9%, by weight.

The reaction of castor oil with toluene diisocyanate may be carried out at temperature between 20° and 50° C., using the pure compounds or the compounds dissolved in a suitable solvent. The reactions run at 50° C. are typically complete in about 5 hours, while those run at room tmeperature may require one week. Typical solvents which may be used include hexane, toluene, methyl ethyl ketone, ethyl acetate, or mixtures of these solvents. A blend of hexane and methyl ethyl ketone is a preferred solvent.

A typical prepolymer with an isocyanate content of about 9% may be prepared by the following procedure:

A kettle equipped with stirrer, condenser, thermometer and gas inlet tube is charged with 1,000 grams of castor oil (hydroxy number=164). Under a nitrogen atmosphere, which is maintained throughout the reaction, the temperature of the kettle is raised to 50° C. and held at that temperature while 543 grams of toluene diisocyanate are added over a two hour period. The temperature of the mixture is then raised to 80° C. and this temperature is maintained for 3 hours. The final reaction mixture is viscous (30,000–40,000 centipoises) and is poured from the kettle while hot. As is known to those versed in the art, variations in hydroxyl number, acid number, and moisture content of the castor oil will require corresponding variations in the amount of toluene diisocyanate used. The prepolymers must be handled under the most anhydrous conditions possible to prevent premature thickening and curing. A typical prepolymer of higher molecular weight and lower isocyanate content (about 4%) can be made by the above procedure using 1,460 grams of castor oil (hydroxyl number=164) and 550 grams of toluene diisocyanate.

Generally, the prepolymers containing about 4% available isocyanate are preferred because adhesives prepared from them show higher green strength and tack. However, they can only be dissolved in a mixed solvent such as a mixture of hexane and methyl ethyl ketone. The lower molecular weight prepolymers, containing up to 9% available isocyanate, are more stable and give an adhesive having improved gloss; they can also be dissolved in more economical solvents such as pure hexane.

The terpene phenolic resins which are used in the adhesives of this invention are prepared by condensing a terpene alcohol with a phenol as is well known in the resin art. This may be illustrated by the representative equation.

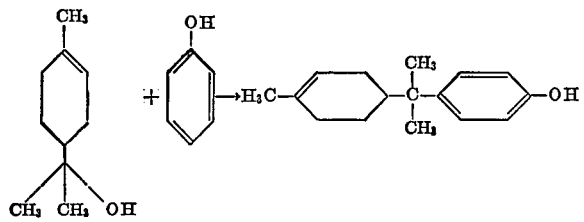

A second terpene group can be added to the phenol if an excess of terpene is present. Terpene hydrocarbons can also be added to phenols by techniques that are known. The terpene phenolic resins may also be condensed with formaldehyde, as is well known, to produce heat reactive or non-reactive resins.

The preparation of terpene phenolic resins is discussed in J. J. Mattiello, Protective and Decorative Coatings, volume I, John Wiley & Sons, Inc., 1941, pages 568–573, and the U.S. patents there referred to, said material being fully incorporated herein.

In general, all terpene phenolic resins are useful in the practice of this invention, although some types are preferred. Terepene phenolic resins exhibit different solubility characteristics according to the ratio of terpene to phenol used and the type of substituted phenol used, some being completely soluble in aliphatic hydrocarbon solvents, other requiring mixtures of aliphatic solvents with more active solvents such as ketones and esters for complete solubility. Both types of terpene phenolic resins are operable in the adhesives of this invention; however, the resins which are completely soluble in aliphatic hydrocarbons are usually preferred because adhesives made from them have longer pot lives than those made with other terpene phenolic resins. Suitable terpene phenolic resins are sold by the Newport Division of Tenneco Chemicals, Inc., as Nirez 2019 and Nirez 2040; by Schenectady Chemicals, Inc., as SP–553, SP–559, and SP–560; and by Pennsylvania Industrial Chemical Corporation as Picco LTP–100, LTP–115, LTP–135, ETP–105, NTP–110, and 3–RTP.

The adhesives of this invention are prepared by mixing the castor oil derived isocyanate prepolymer and the terpene phenolic resin in proportions ranging from 2.5 to 50 parts of resin per 100 parts of prepolymer, by weight. Ordinarily, as is well known to those skilled in the art, a catalyst, e.g., an organic tin compound or an amine derivative, is also incorporated to hasten curing of the adhesive. Dibutyl tin dilaurate is a typical organic tin catalyst while N-methyl diethanolamine is a representative amine catalyst.

The adhesives of this invention are usually prepared by adding a solution of the terpene phenolic resin which may also contain a catalyst if one is used, to a solution of the castor oil derived isocyanate prepolymer immediately before use. This technique maximizes the pot life of the adhesive. However, small amounts of the terpene phenolic resin may be added to the prepolymer solution with or without catalysts to make a one-component adhesive.

The adhesives are usually applied as a solution in an aliphatic solvent such as hexane or a mixed solvent such as a 1:1 mixture of hexane and methyl ethyl ketone to the more dimensionally stable of the films to be laminated at a coating weight of about 1 pound per ream. The adhesive may be coated by any suitable technique such as air knife, trailing blade, knife coater, reverse roll, gravure, or wide wound bar coating. The coating is then dried in an oven at a temperature of about 250° F. The film to be laminated is placed together with the adhesive coated film and the laminate is passed between nip rolls at a temperature of about 175° F. The laminate is then wound up and allowed to age at least overnight. Different oven or nip roll temperatures and different coating weights of adhesive may be found advantageous in different applications.

The bond strength of a laminated sample may be determined by the Suter peel test. In this test a one inch wide strip of the laminate is cut and the two films are peeled apart at a peel angle of 180° on the Suter peel tester at the rate of 12 inches per minute. The samples are tested immediately after coating and again after 24 hours or after longer times if desired.

The film webs which may be bonded by the adhesives of this invention are any of the films commonly used in adhesively sealed flexible packages. Representative films, together with the code numbers that identify them in the examples of this invention are listed in Table A.

TABLE A

| Film: | Code number |
|---|---|
| Aluminum foil, 0.001" thick, one side dull for coating | 1 |
| White glassine paper | 2 |
| Nylon, 0.001" thick | 3 |
| Cellophane, 0.0008" thick, coated on both sides with polyvinylidene chloride | 4 |
| Polyethylene terephthalate, 0.0005" thick | 5 |
| Polyethylene terephthalate, 0.0006" thick, coated on one side with polyvinylidene chloride | 6 |
| Oriented polypropylene, 0.0005" thick, one side flame treated | 7 |
| Low density polyethylene, 0.001" thick, one side flame treated | 8 |
| Low density polyethylene, 0.002" thick, one side flame treated | 9 |
| Medium density polyethylene, 0.002" thick, one side flame treated | 10 |
| High density polyethylene, 0.001" thick, one side flame treated | 11 |

The following examples will illustrate the practice of this invention but are not intended to limit its scope. All parts given are by weight unless otherwise specified.

EXAMPLE I

This example shows the preparation and testing of an adhesive of this invention.

A two-part adhesive composition was prepared having the following formula:

Parts
Part A: Castor oil derived prepolymer (available isocyanate=4%; 80% solids solution in methyl ethyl ketone/hexane (1:1) _____ 80
Part B:
Terepene phenolic resin, aliphatic soluble, melting point 105° C. (807 solids solution in methyl ethyl ketone/hexane (1:1) (Nirez 2019) _____ 20
N-methyl diethanolamine _____ 0.16

Parts A and B were mixed together just before use and diluted with methyl ethyl ketone/hexane (1:1) mixed solvent to make a coating solution containing 25% solids. The adhesive solution was coated by means of a wire-wound bar on a first film web at a coating weight of 1 pound per ream and subsequently oven dried at 250° F. A second web was then laminated to the first web and sealed by passing through nip rolls at a temperature of 175° F. The bond strength was tested by the Suter peel test immediately and again after a 24 hour period of aging at room temperature. The films used and the values of adhesive strength found are tabulated in Table I together with comparative values for control samples laminated with adhesive containing only the castor oil prepolymer without the terpene phenolic additive. The differences in green strength and amount of tunnelling between the control and the adhesive of this invention are evident.

An adhesive was prepared having the following composition:

| | Parts |
|---|---|
| Castor oil derived prepolymer (available isocyanate=4%) | 100 |
| Terpene phenolic resin, aliphatic soluble, melting point 105° C. (Nirex 2019) | 2.5 |
| N-methyl diethanolamine | 0.1 |
| Dibutyl tin dilaurate | 0.02 |
| Solvent (methyl ethyl ketone/hexane (1:1) to give 80% solids. | |

The adhesive was prepared by thoroughly mixing the ingredients, then coated and tested as described in Example I. The results of the tests of this adhesive and of a control containing no terpene phenolic resin are shown in Table III. It may be seen that even the small amount of terpene phenolic resin which can be incorporated in the single mixture formulation of the adhesives of this invention produces a significant improvement in adhesive properties.

TABLE I

| Film coated code No. | Film laminated code No. | Suter peel (green) (grams/inch) Sample | | Control | | Suter peel (24 hrs.) (grams/inch) Sample | | Control |
|---|---|---|---|---|---|---|---|---|
| 1 | 8 | 450 | No channels | 200 | Many channels | Film tears | | 310 |
| 3 | 8 | 425 | do | 220 | do | do | | 315 |
| 6 | 9 | 400 | do | 200 | do | do | | 295 |
| 1 | 4 | 400 | do | 210 | do | do | | 315 |
| 4 | 7 | 410 | do | 205 | do | do | | 320 |
| 2 | 11 | 400 | do | 210 | do | do | | 300 |

EXAMPLE II

This example shows an adhesive according to this invention using a prepolymer having about 9% free isocyanate and a lower molecular weight than the prepolymer of Example I.

TABLE III

| Film coated code No. | Film laminated code No. | Suter peel (green) (grams/inch) Sample | | Control | | Suter peel (24 hrs.) (grams/inch) Sample | | Control |
|---|---|---|---|---|---|---|---|---|
| 1 | 8 | 310 | Few channels | 250 | Several channels | Tears | | Tears. |
| 3 | 8 | 280 | do | 220 | do | do | | Do. |
| 6 | 9 | 250 | do | 200 | do | do | | Do. |
| 1 | 4 | 300 | do | 250 | do | do | | Do. |
| 4 | 7 | 300 | do | 240 | do | do | | Do. |
| 2 | 11 | 290 | do | 240 | do | do | | Do. |
| 5 | 10 | 280 | do | 225 | do | do | | Do. |

An adhesive was prepared by the procedure described in Example I having the following composition:

| | Parts |
|---|---|
| Part A: Castor oil derived prepolymer (available isocyanate=9%; 80% solids solution in hexane) | 100 |
| Part B: Terpene phenolic resin, aliphatic soluble, melting point 105° C. (80% solids solution in hexane) (Nirex 2019) | 50 |
| N-methyl diethanolamine | 0.2 |

The prepared adhesive was coated and tested as described in Example I; results of the tests of this adhesive and of a control containing no terpene phenolic resin are tabulated in Table II.

EXAMPLE IV

This example shows an adhesive formulation according to this invention containing no catalyst.

An adhesive was prepared by the procedure described in Example I having the composition of Example I except that the N-methyl diethanolamine was omitted. The adhesive was coated on film No. 4 and tested as described in Example I using a No. 7 film as the laminate. The bond strength was tested by the Suter peel test. The values obtained were as follows: green—415; after 24 hours—650; after 48 hours—film tears. This example shows that an adequate cure takes somewhat longer than for the catalyzed formulation.

TABLE II

| Film coated code No. | Film laminated code No. | Suter peel (green) (grams/inch) Sample | | Control | | Suter peel (24 hrs.) (grams/inch) Sample | | Control |
|---|---|---|---|---|---|---|---|---|
| 1 | 8 | 300 | Few channels | 50 | Many channels | Film tears | | 150 |
| 3 | 8 | 275 | do | 40 | do | do | | 125 |
| 6 | 9 | 250 | do | 30 | do | do | | 100 |
| 1 | 4 | 250 | do | 30 | do | do | | 110 |
| 4 | 7 | 275 | do | 40 | do | do | | 125 |
| 2 | 11 | 275 | do | 45 | do | do | | 155 |

EXAMPLE III

This example shows the preparation of an adhesive according to this invention in the form of a single mixture.

EXAMPLE V

This example shows the use of several different terpene phenolic resins in the adhesives of this invention.

Several adhesives were prepared by the procedure of Example I using in place of the terpene phenolic resin of that example other terpene phenolic resins. The adhesives were coated as in Example I on film No. 4 and tested as described in Example I using film No. 7 as a laminate. The bond strength, green and aged 24 hours, together with the pot life are tabulated in Table IV. From this data it may be seen that all the terpene phenolic resins tested gave adhesives having the same superior bond strengths, although some adhesives have longer, more desirable pot lives.

TABLE IV

| Terpene phenolic resin | Suter peel test (green) (grams/inch) | Suter peel test (24 hours) | Pot life (days to gel) |
|---|---|---|---|
| Aliphatic soluble, alphapinene derived, softening point 122° C. (Nirez 2019). | 410 | Tears | 4 |
| Alcohol soluble, alpha-pinene derived, softening point 118° C. (Nirez 2040). | 450 | ...do..... | 1 |
| Aliphatic and alcohol soluble, beta-pinene derived, softening point 115° C. (Schenectady SP-553). | 390 | ...do..... | 3 |
| Aliphatic and alcohol soluble, sulfated turpentine derived, softening point 130° C. (Schenectady SP-559). | 350 | ...do..... | 3 |
| Aliphatic soluble, turpentine derived, softening point 150° C. (Schenectady SP-560). | 460 | ...do..... | 2 |
| Aliphatic soluble, softening point 100° C., Gardner viscosity (70% in toluene) H (PICCO LTP-100). | 400 | ...do..... | 4 |
| Aliphatic soluble, softening point 115° C., Gardner viscosity (70% in toluene) S-T (PICCO LTP-115). | 390 | ...do..... | 3 |
| Aliphatic soluble, softening point 135° C., Gardner viscosity (70% in toluene) W-X (PICCO LTP-135). | 405 | ...do..... | 3 |
| Terpene-phenol-formaldehyde resin, softening point 110° C., Gardner viscosity (70% in toluene) W (PICCO NTP-110). | 430 | ...do..... | 1 |
| Terpene-phenol-formaldehyde resin, softening point 95° C., Gardner viscosity (75% in toluene) S (PICCO 3-RTP). | 400 | ...do..... | 1 |
| Alcohol soluble, softening point 105° C., Gardner viscosity (70% in methanol) Q (PICCO ETP-105). | 395 | ...do..... | 1 |

In summary, this invention provides castor oil derived polyurethane adhesives which are economical and have good strength.

Variations may be made in materials, proportions, and procedures without departing from the scope of this invention.

What is claimed is:

1. A curable adhesive composition comprising a solution in a suitable solvent of a castor oil derived isocyanate prepolymer, comprising the reaction product of castor oil and toluene diisocyanate and containing between about 3.5% and 9%, by weight, available isocyanate, and a terpene phenolic resin, wherein said terpene phenolic resin is present in amounts of about 2.5 to 50 parts per 100 parts of said isocyanate prepolymer.

References Cited

UNITED STATES PATENTS

| 3,345,311 | 10/1967 | Ehrlich et al. | 260—18 |
| 3,362,921 | 1/1968 | Ehrlich et al. | 260—18 |
| 3,372,083 | 3/1968 | Evans et al. | 260—18 |
| 3,598,771 | 8/1971 | Davis et al. | 260—47 |
| 3,437,622 | 4/1969 | Dahl | 260—24 |
| 3,463,753 | 8/1969 | Gonzenbach et al. | 161—190 |

OTHER REFERENCES

Handbook of Plastics, by Simonds et al., pp. 411–412, D. Van Nostrand Co., Inc., New York, TP986A2S48.

DONALD E. CZAJA, Primary Examiner

E. C. RZUCIDLO, Assistant Examiner

U.S. Cl. X.R.

161—190; 260—18 TN, 19 R, 47 CB, 75 TN, 77.5 AP, 841